March 8, 1932.  R. BERINGER  1,848,988
STEP DOWN DRIVE GEAR
Filed Nov 1, 1926
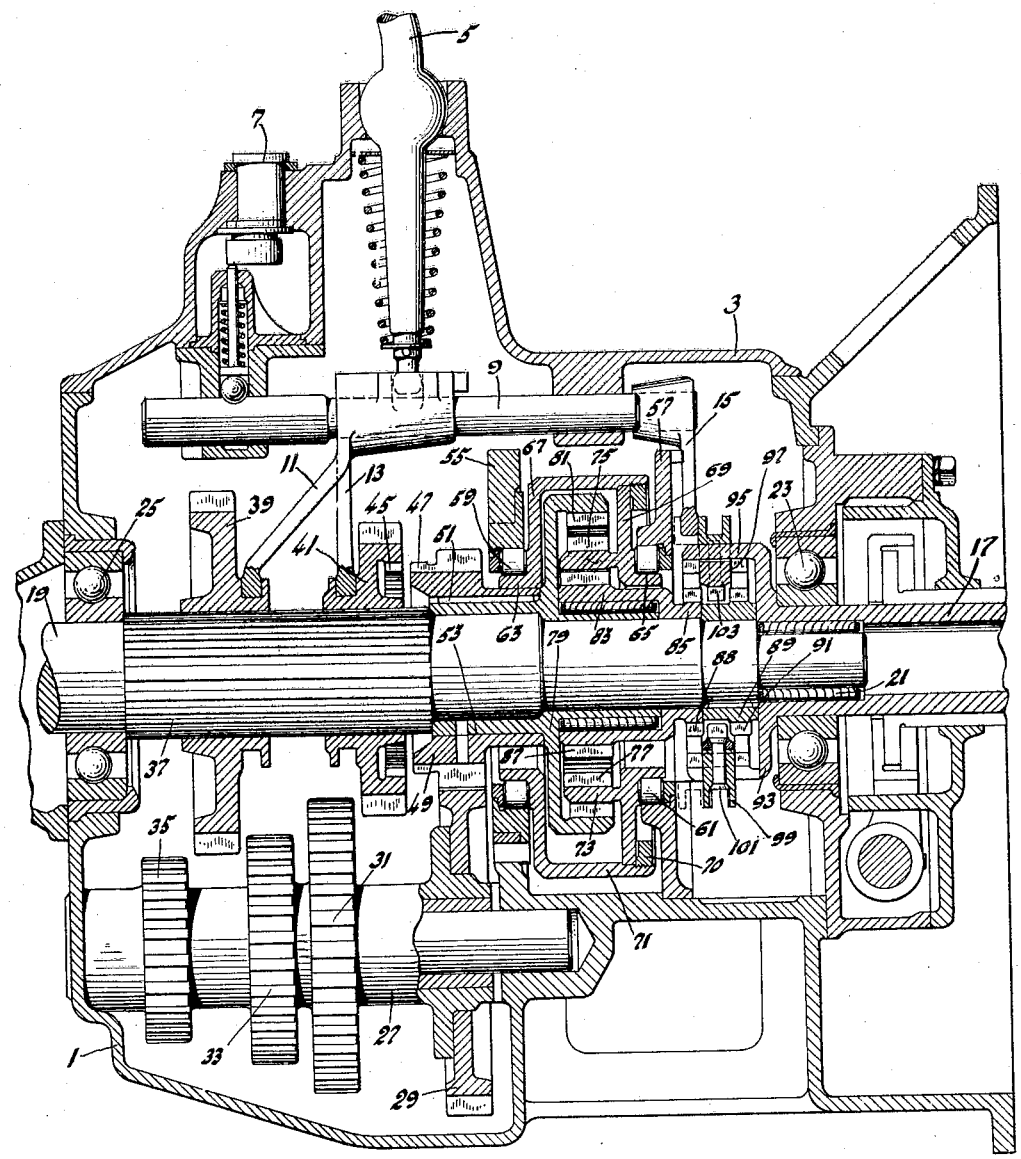
Inventor
Roscoe Beringer
By Blackmore, Spencer & Flint
Attorney Patented Mar. 8, 1932

1,848,988

UNITED STATES PATENT OFFICE

ROSCOE BERINGER, OF DETROIT, MICHIGAN, ASSIGNOR TO GENERAL MOTORS CORPORATION, OF DETROIT, MICHIGAN, A CORPORATION OF DELAWARE

STEP DOWN DRIVE GEAR

Application filed November 1, 1926. Serial No. 145,632.

This is an invention pertaining to transmission gearing and is of a type similar to that described in my patent for four-speed transmission, No. 1,823,421 dated September 15, 1931.

The present invention, like the other, is intended for use particularly on motor vehicles and is arranged to give a direct clutch connection between the clutch driven shaft and the transmission shaft and also a step-down drive through a comparatively quiet internal gear train, which gear train includes an eccentrically mounted gear.

The transmission also includes gear reductions and a reverse drive through spur gearing in much the same way as the common three-speed and reverse gearing.

An object of the present improvement is to so arrange the gearing that when the driving and driven shafts are clutched for direct and highest speed both the internal gear train and the external gear trains are inactive and at rest.

Another object is to so relate the internal and external gearing that the final drive shaft of the internal gear train drives the countershaft, and is also the gear to which the slidable intermediate gear may be clutched to secure a driving ratio corresponding to the usual high gear.

Other objects will be understood from the following description and from an examination of the accompanying drawing.

The single figure of the drawing is a longitudinal section through the transmission housing.

Referring by reference characters to the drawing, numeral 1 represents the transmission housing having a cover 3. Mounted in the cover is the shift lever 5 and 7 is a conventional showing of the lock which is no part of the invention and need not be further described. Any desired interlock between the shift rods, one of which is shown at 9, may be employed. The shift rods carry forks 11, 13 and 15 for sliding the gears, as usual.

The housing 1 receives shafts 17 and 19, shaft 17 being the clutch driven shaft and shaft 19 the transmission shaft. These shafts are as shown in alignment, with the end of transmission shaft being received within the end of the clutch driven shaft, suitable bearings being provided at 21. Suitable bearings 23 and 25 are provided for the aligned shafts. The countershaft 27 is mounted in the casing beneath the aligned shafts. Associated with the countershaft 27 is an idler gear, not shown, to give a reverse drive. The countershaft has a driven gear 29 secured thereto and driving gears 31, 33 and 35 for intermediate, low and reverse drive. Slidable on a splined portion 37 of the transmission shaft is a gear 39 moved by fork 11 to engage gear 33 for driving in low, or the idler which engages gear 35 for driving in reverse.

Also slidable on the splined portion of the transmission shaft is a gear 41 moved by fork 13 for engaging gear 41 with gear 31 for an intermediate speed. Gear 41 may be moved to the right in which position it is clutched by the engagement of its internal teeth 45 with external teeth 47 of gear 49. Gear 49 is always in engagement with gear 29 of the countershaft. It will be seen that this gearing is like the usual three-speed and reverse gearing, differing therefrom in that gear 49 is not a gear fixed to the clutch driven shaft.

Gear 49 is secured by suitable fastening means 51 to a sleeve 53 which is rotatable around the transmission shaft at the portion of the shaft beyond the splined portion 37. The housing is provided with two brackets 55 and 57 having aligned circular openings eccentric with reference to the aligned shafts and surrounding the said shafts. Within said openings in bearings 59 and 61 are journalled outwardly extending annular flanges 63 and 65 of a barrel shaped gear whose heads are shown at 67 and 69. Head 67 has an integral outer ring portion 71 and the head 69 is secured thereto by a threaded ring 70. Head 69 has an inwardly directed flange 73 with external teeth 75 and internal teeth 77.

Sleeve 53 is formed with a flange 79 having internal teeth 81 over-hanging teeth 75 of the barrel gear and engaging the same at one position, at the bottom, as shown in the drawing. Sleeve 53 has an extension through the barrel and rotatable about the same is the enlarged part 83 of a sleeve 85, the sleeve 85 itself being rotatable about the driven shaft beyond the end of sleeve 53. The sleeve 85 is provided with external teeth 87 within the barrel and engaging teeth 77 at the upper portion, as shown in the figure. Sleeve 85, outwardly of the barrel, has external teeth 88. Adjacent sleeve 85 is a clutch 89 keyed to the driven shaft and having teeth 91 spaced from teeth 88.

The clutch driven shaft has a flange 93 located just within the bearing 23 and from the flange projects a slotted sleeve 95. Within the sleeve are teeth or splines engaged by a clutch 97. Clutch 97 is secured to a collar 99 slidable along the outer surface of the slotted sleeve 95, the connection being made by suitable fastening means 101 extending through the slots. Clutch 97 has teeth 103 which are to be engaged with teeth 88 of the sleeve 85 or with teeth 91 of the clutch 89.

By the arrangements described the teeth of clutch 97 are normally, except in the case of the direct drive, kept in engagement with the teeth 88 of sleeve 85, whereby the internal gear train, including the eccentric gear, drives gear 49 and the latter keeps the countershaft in rotation. Under these circumstances the shifting of gears 39 and 41 gives a drive in reverse, in low or in intermediate.

If gear 41 is moved to the right it may be clutched to gear 49. This clutch engagement gives the direct drive between the driven shaft 19 and the final driven gear of the internal gear train 49. It is intended that this drive shall represent a speed substantially like the usual high. To directly clutch the clutch driven shaft with the transmission shaft, to secure the highest possible speed, gear 41 is moved to neutral position as shown in the drawing; and clutch 97 is moved to engage teeth 103 with teeth 91, whereupon not only is there a direct drive between shafts 17 and 19 but the whole system of internal gearing and the countershaft gearing is idle.

The arrangement is compact; the internal gear train is so positioned relative to the bearings as to be well supported and the shifting is so much like that already familiar to the driver of the present day cars as to offer no difficulty in manipulation.

I claim:

In combination, aligned driving and driven shafts; a clutch rotatable with and slidable on the end of said driving shaft; a clutch fixed to the adjacent end of said driven shaft; having external teeth spaced from the teeth of the clutch fixed to said shaft; means to move said slidable clutch into engagement with the teeth of driven shaft clutch or the teeth of the rotatable sleeve, an internal gear eccentrically surrounding said sleeve gearing between said sleeve and internal gear, a second sleeve surrounding said driven shaft and driven by the eccentric gear, means to clutch the driven shaft into engagement with said second sleeve.

In testimony whereof I affix my signature.

ROSCOE BERINGER.